United States Patent
Yao et al.

(10) Patent No.: US 12,028,175 B2
(45) Date of Patent: Jul. 2, 2024

(54) METHOD OF AND A COORDINATOR DEVICE FOR SELECTIVELY COMMISSIONING A NODE DEVICE IN NETWORK

(71) Applicant: SIGNIFY HOLDING B.V., Eindhoven (NL)

(72) Inventors: Jun Yao, Shanghai (CN); Zhizhong Zhang, Shanghai (CN); Peiliang Dong, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/796,005

(22) PCT Filed: Feb. 8, 2021

(86) PCT No.: PCT/EP2021/052947
§ 371 (c)(1),
(2) Date: Jul. 28, 2022

(87) PCT Pub. No.: WO2021/160555
PCT Pub. Date: Aug. 19, 2021

(65) Prior Publication Data
US 2023/0050614 A1    Feb. 16, 2023

(30) Foreign Application Priority Data

Feb. 11, 2020  (WO) ................ PCT/CN2020/074754
Apr. 10, 2020  (EP) ..................................... 20169167

(51) Int. Cl.
H04L 12/12     (2006.01)
H04L 67/125    (2022.01)

(52) U.S. Cl.
CPC ............ *H04L 12/12* (2013.01); *H04L 67/125* (2013.01)

(58) Field of Classification Search
CPC .............................. H04L 12/12; H04L 67/125
(Continued)

(56) References Cited

U.S. PATENT DOCUMENTS 6,381,316 B2    4/2002 Joyce et al.
8,655,995 B2 *  2/2014 Elston, III ............ H04W 24/02
                                                    370/254

(Continued)

OTHER PUBLICATIONS

Zigbee Alliance: "Zigbee Specification—Zigbee Document 05-3474-21", Aug. 5, 2015 pp. 1-565, XP055691445, reviewed from the Internet (Year: 2015).*

(Continued)

*Primary Examiner* — Frantz B Jean (57) ABSTRACT

A method of selectively commissioning a node device by a coordinator device in a network created by the coordinator device is disclosed. The coordinator device and the node device interact with each other to check and confirm that a coordinator temporal indication related to a commissioning start time recorded by the coordinator device and a node temporal indication related to a commissioning start time recorded by the node device are the same or temporally very similar or close to each other. Then the coordinator device will commission the node device by joining the node device into the network created by the coordinator device. The ensures that only wanted or expected node devices will be joined into the network created and managed by the coordinator device.

15 Claims, 5 Drawing Sheets

(58) Field of Classification Search
USPC .......................................................... 709/220
See application file for complete search history.

(56) References Cited

U.S. PATENT DOCUMENTS

| | | | |
|---|---|---|---|
| 2010/0150063 A1* | 6/2010 | Lee ...................... | H04W 99/00 |
| | | | 370/328 |
| 2015/0373752 A1 | 12/2015 | Turon et al. | |
| 2016/0142263 A1 | 5/2016 | Erdmann et al. | |
| 2016/0248629 A1* | 8/2016 | Erdmann ............ | H04L 41/0859 |
| 2018/0014988 A1 | 1/2018 | Diaz-Flores et al. | |
| 2019/0324412 A1 | 10/2019 | Barco et al. | |

OTHER PUBLICATIONS

Daintreenetworks: "Understanding Zigbee Commissioning", 2007, pp. 1-14.
Digi, "XBee/XBee-PRO S2C Zigbee RF Module", 2018, pp. 1-309.
Zigbee, "Control Your World", ZigBee Specification, Aug. 5, 2015, pp. 1-565.

* cited by examiner

METHOD OF AND A COORDINATOR DEVICE FOR SELECTIVELY COMMISSIONING A NODE DEVICE IN NETWORK

CROSS-REFERENCE TO PRIOR APPLICATIONS

This application is the U.S. National Phase application under 35 U.S.C. § 371 of International Application No. PCT/EP2021/052947, filed on Feb. 8, 2021, which claims the benefits of European Patent Application No. 20169167.2, filed on Apr. 10, 2020 and Chinese Patent Application No. PCT/CN2020/074754, filed on Feb. 11, 2020. These applications are hereby incorporated by reference herein.

TECHNICAL FIELD

The present disclosure generally relates to the field of managing node devices of a network, and, more specifically, to a method of and a coordinator device for selectively commissioning a node device in a network.

BACKGROUND

Electric or electronic devices, such as lighting devices and Internet of Things, IoT, devices, and devices supporting enhanced Machine-Type Communication, eMTC, for example, all of which comprise data communication capabilities, are frequently deployed in networks comprised of a plurality of interconnected devices.

These devices, generally called node devices or terminal devices, or router devices, depending on their roles in different networks, may comprise a communication interface, such as a network adapter or transceiver module, for communication between node devices and possibly also with remote devices, such as a backend device or backend server.

The communication interface may operate in accordance with a network protocol for exchanging data by networked devices or nodes, such as designated ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and proprietary communication technologies and protocols, for example.

The communication interface may further operate in accordance with a wireless mobile communication standard, such as designated 2G/3G/4G/5G cellular communication, and other long-range wireless communication technologies like Long Range Wide Area Network, LoRaWAN, and Narrowband IoT, NB-IoT, or proprietary communication technologies, and/or a wired data exchange communication technology, for example.

With IoT node devices, such as ZigBee node devices, commissioning is the first step to establish a wireless IoT network. However, a commissioning process is generally open in the sense that a ZigBee coordinator device can join or pull or collect any node device into its network, as long as these node devices are searching for a network to join at a point of time when the network created by the coordinator device is available to join.

When more than one coordinator devices belonging to different networks perform network join actions simultaneously, node devices will join the available networks randomly. In this case, it is even easier for a node device to join a wrong network, which will cause problems in network connectivity and create operation confliction.

A way of ensuring that only a specified group of node devices will join a specific network is to have the coordinator device store identifiers of node devices allowed to join the network of the coordinator device. This approach however imposes extra storage burden to the coordinator device and needs a lot of manual effort to input the identifiers of the node devices into the storage means. Besides, such an approach is essentially impractical for real applications due to uncertainty associated with expected nodes in a specific network.

US2016248629A1 discloses a commissioning tool able to configure and commission devices belonging to different ZigBee public profiles.

"XBee/XBee-PRO S2C Zigbee RF module" proposes to prevent unwanted devices from joining when a new device is needed to be added to a network by enabling permit-joining for a short time on the network.

Therefore, there is a genuine need for a commissioning method which guarantees that all node devices can join a correct IoT network.

SUMMARY

In a first aspect of the present disclosure, there is presented a method of selectively commissioning a node device by a coordinator device in a network created by the coordinator device, each of the coordinator device and the node device operating in accordance with a time basis and recording a commissioning start time, the method comprising the steps of:
  transmitting, by the coordinator device, a network-available message;
  receiving, by the coordinator device, from the node device a joining request comprising a node temporal indication related to the commissioning start time of the node device;
  determining, by the coordinator device, the coordinator temporal indication matches the node temporal indication, and
  commissioning, by the coordinator device, the node device by joining the node device into the network.

The present disclosure is based on the insight that a time-based selective commissioning method can be used to ensure that a node device will join a correct or appropriate or intended network created by a coordinator device.

In an embodiment, the coordinator temporal indication and the node device temporal indication comprise the commissioning start time of coordinator and node device respectively.

In particular, the solution in accordance with one embodiment of the present disclosure relies on checking, by the coordinator device, that commissioning start times respectively recorded by the coordinator device and the node device and respectively relating to powered-up time of the coordinator device and the node device are the same or temporally very similar or close to each other. The temporal proximity or equality between the powering up times of the coordinator device and the node device helps to ensure that the network created by the coordinator device is the correct network for the node device to join. This is based on the scenario that the coordinator device and node devices start to commissioning once they are powered up.

In one embodiment, the method of the present disclosure is especially advantageous when the coordinator device together with the node device perform a twofold check to determine that the coordinator device and the node device are powered up simultaneously or that the node device is powered up very soon after the powering up of the coordinator device. In an embodiment related to this scenario, the joining request is transmitted by the node device in response to determining that the coordinator temporal indication matches the node temporal indication.

For implementation of the solution of the present disclosure, the coordinator device first transmits a network-available message indicating the availability of the network created by the coordinator device. The network-available message comprises a coordinator temporal indication related to the commissioning start time of the coordinator device. Upon receiving the network-available message, the node device transmits a joining request to the coordinator device, requesting to join the network created by the coordinator device. The transmission of the joining request may specially depend on the node device deciding that the coordinator temporal indication matches the node temporal indication related to the commissioning start time of the node device.

Thereafter, the coordinator device (once again) determines and confirms that the coordinator temporal indication and the node temporal indication match each other, this is to decide that the commissioning start times of both the coordinator device and the node device are the same or very similar to each other. After that, the coordinator device commissions the node device by joining it into the network.

In one embodiment, the method of the present disclosure therefore performs a bi-directional check of the commissioning start times of both the coordinator device and the node device and allows the node device to join the network created or owned by the coordinator device only when the coordinator temporal indication and the node temporal indication respectively related to the commissioning start time of the coordinator device and the node device match each other. This twofold check guarantees that the network will only have node devices switched on at the same time or after the powering up of the coordinator device join the network, and that no other node device such as node devices powered up already for a while before the powering up of the coordinator device will accidently or wrongly join the network.

The method does not require extra storage by the coordinator device for storing identifiers of node devices allowed to join the network, this is advantageous, especially considering that the coordinator device normally does not have strong storage capacity.

In an embodiment, the selective commissioning is essentially realised by switching on the coordinator device and the node device at the same time, which is straightforward and easy to control, and does not require special control instructions.

In an embodiment of the present disclosure, the step of transmitting comprises broadcasting, by the coordinator device, a beacon message indicating availability of the network as the network-available message.

In this case, a node device seeking to join a network can operate in a so-called passive scan mode, that is, the node device just listens and waits for the beacon message, which is the network available message, indicating presence or availability of the network created by the coordinator device. Receiving such as a beacon message allows the node device to check and decide if the network is the correct network to join.

This allows the coordinator device more flexibility in controlling the time when node devices are allowed to join the network. Specifically, when the coordinator device is switched on before the node device, it can get ready to create the network, and then send a message or instruction or an induction to have the node devices that are supposed and allowed to join the network switched on or powered up. Then the coordinator device broadcasts the beacon message, inviting the node devices to join the network.

In another embodiment of the present disclosure, the step of transmitting comprises transmitting, by the coordinator device, in response to receiving a beacon request message from the node device, a beacon response message indicating availability of the network as the network-available message.

In this case, a node device seeking to join a network operates in a so-called active scan mode. In this mode, the node device sends a beacon request message, requesting to join a network. Upon receiving the beacon request message, the coordinator device transmits a beacon message, that is, a beacon response message, to the node device. The beacon response message comprises the coordinator temporal indication related to the commissioning start time of the coordinator device. The node device then checks and decides if the network is the correct network to join by checking if the coordinator temporal indication matches the node temporal indication.

The above interaction procedure between the coordinator device and the node device is easy to implement, especially for the scenario when the coordinator device and the node device are powered up at the same time. The node device actively searching for the available network can help to improve the overall commissioning efficiency.

In an embodiment of the present disclosure, the step of determining the coordinator temporal indication matches the node temporal indication comprises the steps of:
  calculating, by the coordinator device, a time difference between the commissioning start time of the coordinator device and the commissioning start time of the node device, and
  deciding, by the coordinator device, that the time difference is smaller than a predefined threshold value.

To decide that the coordinator temporal indication matches the node temporal indication, the coordinator device checks to see if the two devices start commissioning at about the same time. This is realised by calculating the time difference between the commissioning start time of the coordinator device and the commissioning start time of the node device and deciding that a match is present when the time difference is smaller than a predefined threshold value, such as 10 seconds.

The node device decides that the coordinator indication matches the node indication in a similar way.

Such a determination step involves a simple arithmetic operation and comparison and can be performed by the coordinator device easily without requiring much computational resource.

In an embodiment of the present disclosure, the coordinator temporal indication related to the commissioning start time of the coordinator device comprises a first elapsed time from the coordinator device being powered up to the network-available message being transmitted by the coordinator device, the node temporal indication related to the commissioning start time of the node device comprises a second elapsed time from the node device being powered up to the joining request being transmitted by the node device, the step of calculating comprises calculating a time difference between the first elapsed time and the second elapsed time.

In this case, the coordinator temporal indication and the node temporal indicate are both relative times calculated to respectively indicate the commissioning start time of the coordinator device and the node device. This approach is generally applicable to various scenarios, independent of whether the coordinator device and the node device are synchronised and/or powered up at the same time, or not.

From the coordinator device side, the commissioning start time is calculated as an elapsed time, from when the coordinator device transmitting a ready message indicating that commissioning has started, to when the network-available message is transmitted by the coordinator device. Whether the node device is started the same time as or later than the coordinator device, its commissioning start time will be calculated simply from the powering up of the node device to when the joining request is transmitted by the node device.

Using the relative time as the temporal indication is advantageous in that possible deviation in, for example, system times of the coordinator device and the node device may be offset, which helps to ensure accurate implementation of the method. On the other hand, using the absolute time as the temporal indication is also easy and straightforward.

In a further embodiment of the present disclosure, the coordinator device and the node device are synchronized and powered up at substantially the same time, the coordinator temporal indication related to the commissioning start time of the coordinator device comprises a first time when the coordinator device is powered up, the node temporal indication related to the commissioning start time of the node device comprises a second time when the node device is powered up, the step of calculating comprises calculating a time difference between the first time and the second time.

This is specially applicable to the case that the coordinator device and the node device are synchronised and powered up at the same time. In this case, the coordinator and node temporal indications can be an absolute time. The absolute time may be equivalent to a powering up time of the coordinator or node device. The determination step is even more straightforward as it involves simple and arithmetic calculation of recorded powering up time of both devices.

In an embodiment of the present disclosure, the transmitted message further comprises a flag generated by the coordinator device within a time window subsequent to creation of the network, the joining request further comprises the flag.

As a supplementary measure for ensuring that the coordinator device and the node device can determine that their commissioning start time are the same or very similar to each other, the coordinator device generates, within a time window such as a short period of time after the creation of the network by the coordinator device, a limited number of flags. The coordinator device further has one flag included in each network-available message transmitted within the short period of time therefore comprises such a flag.

A flag may be a random number. As the number of flags is limited, a number of transmitted network-available message comprising a flag is also limited. Only node devices powered up within this short period of time will receive a network-available message together with a flag. Therefore, the node device can decide that it is powered up at a time essentially the same as the coordinator device, if the network-available message received by the node device includes such a flag.

The node device, upon receiving the network-available message comprising the flag, first determines that the coordinator temporal indication matches the node temporal indication, and then checks to see that the flag is present. By this means, the node device confirms by two different criteria that the commissioning start time of the coordinator device is the same or very similar to its own commissioning start time. In transmitting the joining request, the node device also includes the received flag in the joining request.

Accordingly, in an embodiment of the present disclosure, the step of determining that the coordinator temporal indication matches the node temporal indication further comprises determining that the flag matches one of the plurality of flags transmitted by the coordinator device.

The coordinator device decides that the node device is acceptable to join the network if the flag comprised in the joining request from the node device is a flag previously generated and transmitted. This is an extra measure of preventing the coordinator device from drawing unwanted or undesired node devices into its network.

In an embodiment of the present disclosure, the network-available message is transmitted to node devices within a limited number of hops away from the coordinator device.

It thereby restricts the transmission of the network-available message, that can be a beacon response or a network beacon message, to a specified range. As an example, the transmission of the network-available message is limited to node devices two hops away from the coordinator device, which means the network-available message will be discarded, if the node device receiving the network-available message is further than two hops away, thereby avoiding the unnecessary transmission to a larger field.

In an embodiment of the present discourse, each of the coordinator device and the node device operating a Medium Access Control, MAC, data processing protocol sub-layer, wherein the coordinator temporal indication and the node temporal indication are respectively comprised in MAC transmission offset field of the network-available message and the joining request.

The MAC sub-layer is part of the data link layer defined by the Open System Interconnections, OSI, model that conceptualizes how communications data should be processed between systems.

Having messages exchanged between the coordinator device and the node device, that is, the network-available message comprising the coordinator temporal indication and the joining request comprising the node temporal indication, transmitted as MAC sub-layer message has the advantage of reducing traffic in a wireless channel that the network operates on.

In an embodiment of the present disclosure, the step of determining is performed by the MAC data processing protocol sub-layer.

Transmission of a message from a source device to a destination device in a network normally involves the MAC sub-layer and/or the network layer. For broadcast of a message, the network layer usually relies on the MAC sub-layer broadcast to transfer the message from the source device to the destination device. That is, the message usually does not go to the network layer for data processing if the message propagates in the same network.

Therefore, in the present disclosure, the implementation, in the MAC layer, of determining that the coordinator temporal indication matches the node temporal indication is more efficient in terms of usage of computational resources. Overall, better performance is achieved by performing the determination at the lower MAC sub-layer.

A second aspect of the present disclosure provides a coordinator device arranged for selectively commissioning a node device in a network created by the coordinator device based on the method according to the first aspect of the present disclosure.

A third aspect of the present disclosure provides a node device arranged for being selectively commissioned based on the method according to the first aspect of the present disclosure.

In an embodiment of the present disclosure, the node device comprises a lighting fixture.

The method of the present disclosure can be advantageously used to configure or commission a large number of node devices comprising lighting fixtures, such as lighting features in a building or a stadium.

In a fourth aspect of the present disclosure, a computer program product is provided, comprising a computer readable storage medium storing instructions which, when executed on at least one processor, cause the at least one processor to carry out the method according to the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

The present disclosure is detailed below with reference to lighting devices functioning as node devices of a network created by a coordinator device commissioning the lighting devices in the network. Those skilled in the art will appreciate that the present disclosure is not limited to commissioning a network of lighting devices, but is applicable for networks of a wide variety of node devices enabled with network communication connectivity, as indicated in the background part.

Figure 1:
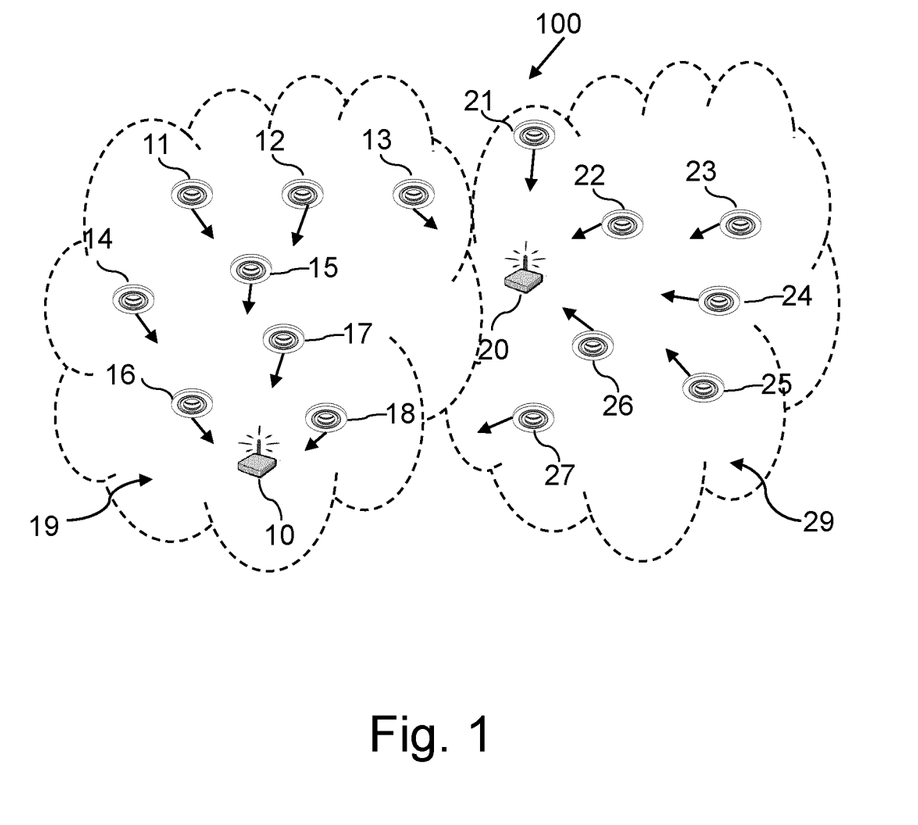
FIG. 1 schematically illustrates a diagram of two coordinator devices commissioning a plurality of node devices.

FIG. 1 schematically illustrates a diagram 100 of two coordinator devices 10 and 20 configuring a plurality of node devices 11-18 and 21-27.

With the deployment of more and more Internet of Thing, IoT, networks such as ZigBee networks, it is common to have more than one networks comprising a plurality of node devices at a same site, such as in a same building or in the neighbourhood of a community. In the diagram as illustrated in FIG. 1, two networks 19, 29 respectively created by two coordinator device 10, 20 are present at the same site.

After creating the respective network 19, 29, the coordinator devices 10 and 20 operate to commission the node devices, that is, the lighting devices, 11-18 and 21-27, by joining the node devices into the networks 19, 29. In practice, based on a deployment or installation plan, it is required that certain lighting devices should join a specific network while other lighting devices should join other network(s). In the example of FIG. 1, it is designed that the lighting devices 11-18 will join the network 19 created by the coordinator device 10, while the lighting devices 21-27 will join the network 29 created by the coordinator device 20, as indicated by broken lines in FIG. 1.

However, commissioning of these node devices by for example two or more different coordinator devices may encounter an awkward problem, that is, some node devices may join the wrong network, especially when the two coordinator devices 10, 20 operate at the same time to join or pull the node devices 11-18, 21-27 into the networks 19, 29. In the example of FIG. 1, an arrow by each node device indicates the network that the node device joins. It is seen that the node devices 13 and 27 are mistakenly drawn into the wrong network, as indicated by arrows besides the node devices 13 and 27.

In this case, it is very difficult for customers to try to solve the problem by themselves. Actually, in most cases trained technicians or engineers have to get involved to solve the problem.

Besides, during the development of a project, many node devices will join or leave the network(s) frequently, which increases chances for node devices to join the wrong network.

A method of selectively commissioning node devices by a coordinator device, which will be detailed in the following, will provide a solution for obviating the above problems.

Figure 2:
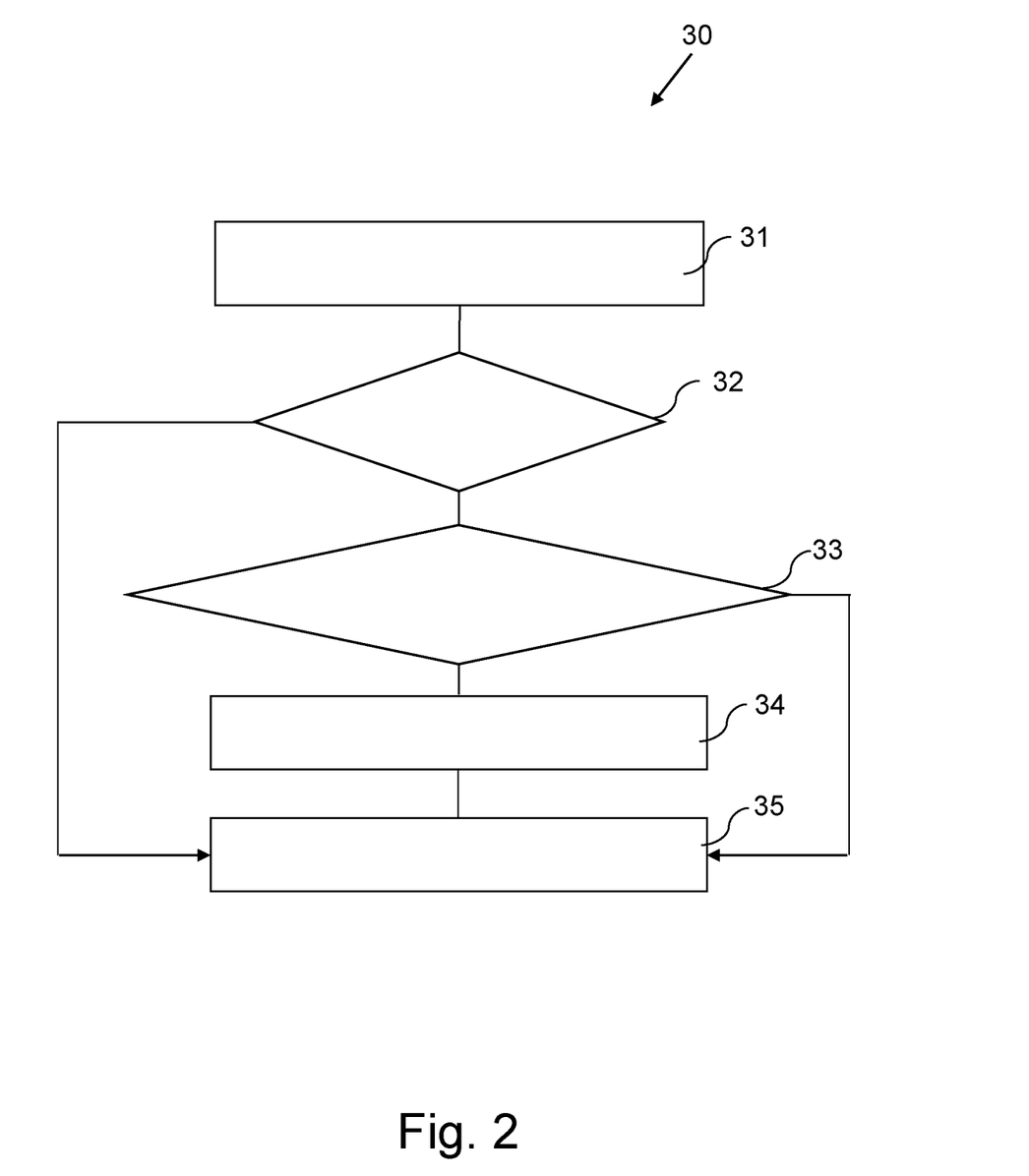
FIG. 2 schematically illustrates, in a flow chart type diagram, an embodiment of a method of creating a network by a coordinator device in accordance with an embodiment of the present disclosure.

FIG. 2 schematically illustrates, in a flow chart type diagram, exemplary steps of a method 30 of creating a network by a coordinator device in accordance with an embodiment of the present disclosure.

A coordinator device, such as a dongle or a modem operating as a ZigBee coordinator, is a device that can start or create a network and is responsible for selecting a channel, a Personal Area Network identifier, a PAN ID, a security policy, and a stack profile for the network. After the coordinator device has started the network, it may allow raw devices, such as node devices or terminal devices, to join the network.

In the present disclosure, after the coordinator device is powered up and before it creates a new network, at step 31 "coordinator scanning channels", the coordinator device, such as the coordinator device 10 of FIG. 1, scans all channels, to discover, at step 32 "network existing?", any possible existing network that is created by a different coordinator device. The existing network is open for node devices to join.

If the coordinator devices 10 does not find any open or existing network at step 32, it proceeds to step 35 "coordinator creating a new network", to create a new network. The coordinator device 10 may send a ready message to a mobile phone of a field engineer or technician or turn on an optical indictor to indicate to the field engineer or technician that the node devices can be powered up. The coordinator device 10 may also send a relay drive message to power up the node devices 11-18. The coordinator device 10 then creates a new network 19.

If the coordinator device 10 receives a beacon message of a network joining permit in a certain channel, that is, it is determined at step 32 there is already a network open and available for the node devices to join, such as the network 29 created by the coordinator device 20 of FIG. 1, the coordinator device 10 will detect a commissioning start time of that network 29 and check whether the commissioning start time of the existing network is recently recorded, at step 33 "commissioning start time of the existing network recently recorded?".

In the case that the commissioning start time of that network 29 is apparently different from that of the new network 19 to be opened or created by the coordinator device 10, that is, the determination result of step 33 is negative, the coordinator device 10 will proceed to step 35 and get ready to create the new network, as described above.

On the other hand, if the commissioning start time of the existing network 29 shows that the commissioning start time is just recorded, that is, the determination result of step 33 is positive, it is likely that the commissioning of the existing network 29 is still on going. In this case, to prevent unwanted node devices from being pulled or joined into the existing network 29, at step 34 "coordinator waiting for a while", the coordinator device 10 will wait for a while, several minutes for example, so as to make sure that its own commissioning start time will be different from that of the existing network 29.

Then the coordinator device 10 will proceed to step 35 and get ready to create the new network 19. The coordinator device 10 may send a ready message to a mobile phone of a field engineer or turns on a light to indicate to the field engineer that the node devices can be powered up. The coordinator device 10 may also send a relay drive message to power up the node devices 11-18.

The coordinator device 10 may create a new network 19 in a channel with less interference and transmits a network permit join command to allow node devices to join the new network 19.

Figure 3:
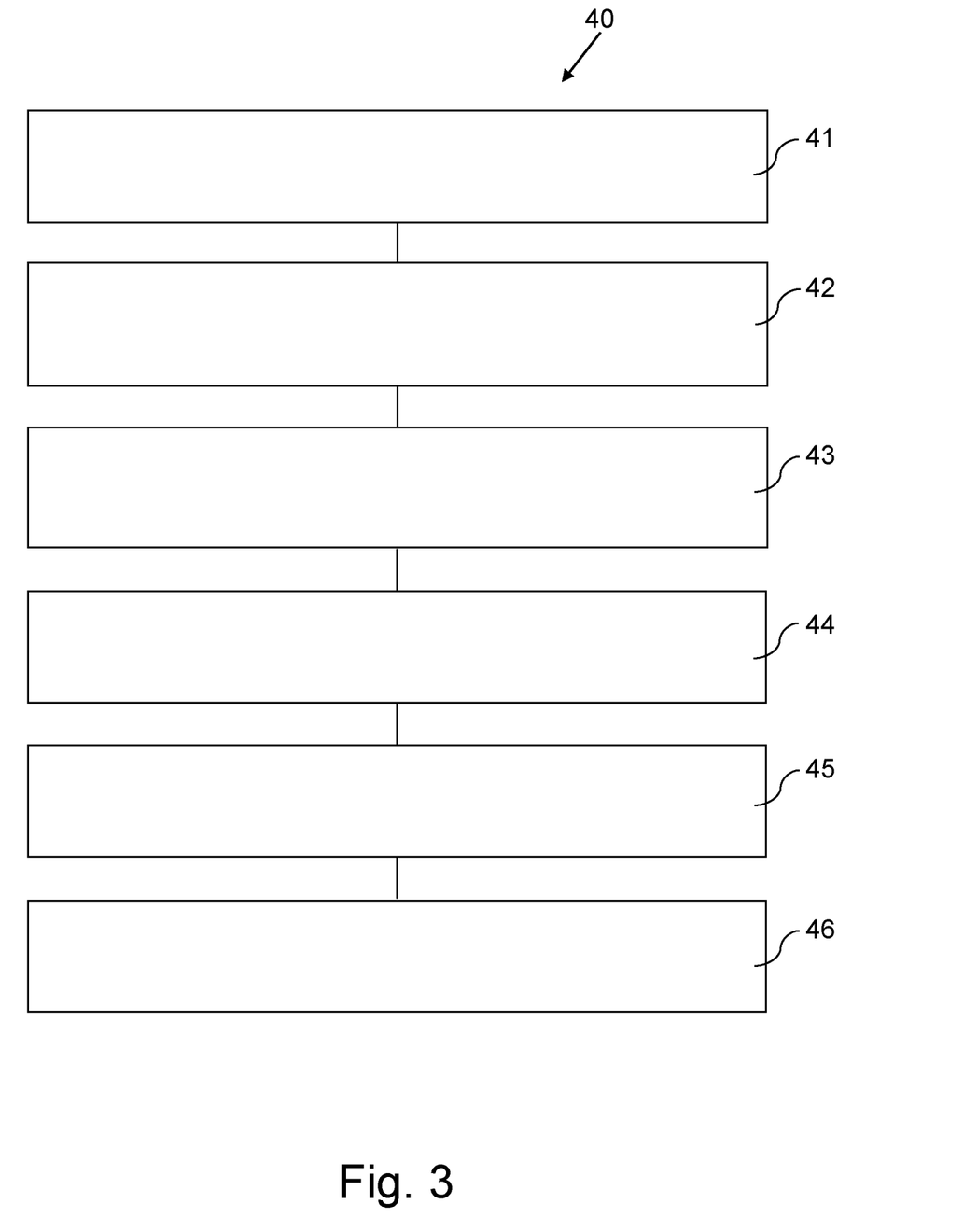
FIG. 3 schematically illustrates, in a flow chart type diagram, an embodiment of a method of selectively commissioning a node device by a coordinator device in accordance with the present disclosure.

FIG. 3 schematically illustrates, in a flow chart type diagram, exemplary steps of a method 40 of selectively commissioning node devices in a network by a coordinator device in accordance with an embodiment of the present disclosure.

With the method of FIG. 3, it is assumed that the coordinator device has already been powered up and created a network for node devices to join, this is realised by transmitting for example a network permit join command to allow node devices to join. It is also assumed that all raw node device to be commissioned, that is, intended to join the network created by the coordinator device, are also powered up.

Other than the scenario as described with reference to FIG. 2 where the coordinator device is powered up first and then the node devices are powered up subsequently, it is also possible that both the coordinator device and the node devices are synchronized in their system time and are powered up simultaneously.

At step 41, "coordinator device and node device recording respective commissioning start time", both the coordinator device and the node device record a commissioning start time, which may be an absolute time or a relative time.

An example of the commissioning start time recorded as an absolute time can be a system clock time when the coordinator device or the node devices are powered up. This is applicable when the coordinator device and the node device are synchronized and powered up simultaneously.

In contrast, in recording the commissioning start time as the relative time, the coordinator device will count its commissioning start time as time 0 second, and start a timer recording an elapsed time from the commissioning start time. Zero second of the coordinator device may be a time when the coordinator device is powered up, or a time when the coordinator device transmits a ready message to have the node devices powered up. It is also possible that the coordinator device knows the powering up time of raw or un-commissioned node devices. In this case, the coordinator device can record its commissioning start time once the node devices are switched on or powered up.

The node device records its commissioning start time as a relative time in a similar way, which is generally an elapsed time counted from when the node device is powered up.

The commissioning start time recorded as the relative time is therefore a variable which is incremented with the time passing, from when the commissioning is considered to start, to when the coordinator or node device transmits a message, which may be a network-available message, or a joining request, as described below.

The relative time is especially applicable to the scenario when the coordinator device is powered up first, and has to wait for a while, after being powered up and before creating the network for the node devices to join. It can be contemplated by those skilled in the art that the relative commissioning start time is also applicable to other scenarios, independent of whether the coordinator device and the node device are synchronised or not, or started up at the same time or not.

At step 42, "the coordinator device transmitting a network-available message, optionally, comprising coordinator temporal indication related to commissioning start time of coordinator device", the coordinator device transmits a network-available message, which shows that the network created by the coordinator device is now available to be joined. Moreover, the network-available message also comprises a coordinator temporal indication, that is, a time indication, which is related to the commissioning start time as recorded by the coordinator device, which is either the absolute time or the relative time.

Depending on a channel scan mode employed by the node devices, the network-available message may be different messages transmitted by the coordinator device in different ways.

With an active scan method, a node device sends out beacon request packets to detect available networks. Therefore, it is not necessary for the coordinator device to send beacon packets all the time.

In practice, a raw or un-commissioned node device will send out the beacon request in certain channels and wait for response from an open network. The coordinator device, upon receiving the beacon request message from the node device, will transmit a beacon response to the node device. Optionally, the beacon response contains a node temporal indication related to the commissioning start time of the coordinator device.

With a passive scan method, a node device to be commissioned just listens to packets in the channels to check available networks. The coordinator device will keep on sending out network beacons to inform the node device and other node devices of the existence of the network created by itself. The network beacon contains the coordinator temporal indication related to the commissioning start time of the coordinator device.

The coordinator temporal indication related to the commissioning start time of the coordinator device in the beacon response or network beacon message may be included as MAC sub-layer beacon payload parameters, which is defined for example in ZigBee 3.0.

Figure 4:
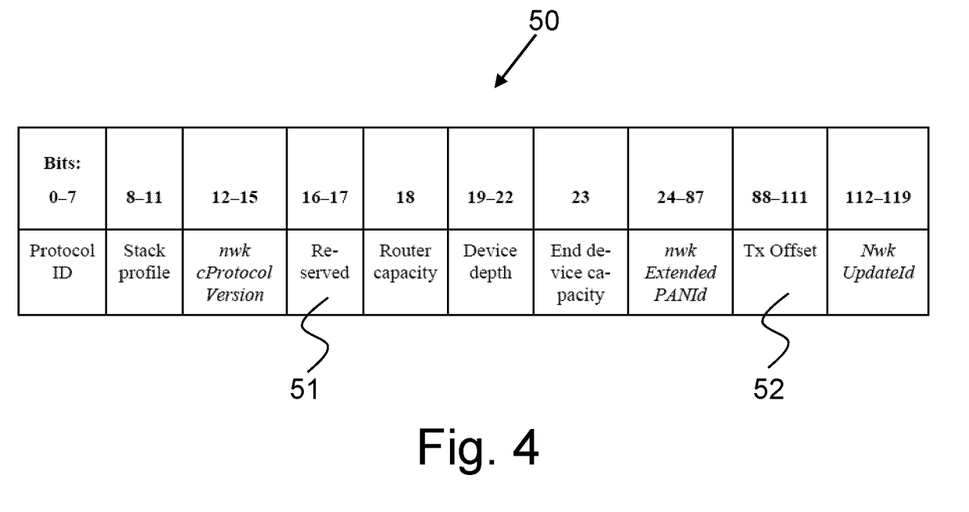
FIG. 4 schematically illustrates an example of detailed format of MAC sub-layer beacon payload.

FIG. 4 schematically illustrates an example 50 of a detailed format of MAC sub-layer beacon payload. Specifically, the reserved bits 51 and Tx offset 52 may be used to realise the transmission of the coordinator or node temporal indication, that is, the commissioning start time recorded by the coordinator device or the node device.

As shown in FIG. 4, the reserved bits 51 may be used to indicate whether the selective commissioning is applied or enabled. For example, when "01" is set for the bits 16 and 17, it represents that the selective commissioning is enabled.

Moreover, "Tx offset" 52 may be used to store the commissioning start time. This section contains 24 bits and may store the absolute or the relative time, which respectively records the time when the commissioning starts or a passed time from the commissioning starts.

In addition to the inclusion of the coordinator temporal indication in the transmitted network-available message, the coordinator device may further generate and include a flag in the transmitted network-available message.

The flag may be a random number generated by the coordinator device within a very short time period, such as a small time window, from when the commissioning procedure is started.

Specifically, for the active scan method, the coordinator device will receive many beacon requests at the beginning of the commissioning procedure, especially for a large scale network. The coordinator will generate a limited number of flags, depending on the number of node devices to be commissioned or joined into its network, and include the flags in the network-available messages, that is, the beacon response messages, that the coordinator device transmits. Beacon response messages transmitted after the short period of time will return to a regular state and includes no random number.

As for passive scan, the coordinator device will always send network beacons and the node devices just listen. The coordinator will control the network beacons containing the random numbers used for commissioning in a similar way, to ensure that only network beacons transmitted within a short period after the commissioning procedure starts includes the random number as the flag.

These special network beacons are broadcasted to the node devices, it therefore ensures that all node devices powered up at this time will receive the network beacon comprising the random numbers. The time window for the node devices to receive these random numbers is also short, which makes it difficult to pull unexpected node devices into this network.

The "Tx offset" 52 may also be used to store the flag generated by the coordinator device.

Referring back to FIG. 3, at step 43, the node device receiving the network-available message from the coordinator device compares the coordinator temporal indication and the node temporal indication and determines that the two temporal indications match each other.

Specifically, the node device calculates a time difference between the commissioning start time recorded by the coordinator device and a commissioning start time as recorded locally by the node device itself. If the time difference is small enough, for example, smaller than a predefined threshold value, such as 0.5 second, it is determined that the commissioning start time in the network-available message is similar to the commissioning start time of the node device. This suggests that the currently available network is the network that the node device should join.

In the case that the network-available message also comprises the random number as the flag, the node device first determines that the coordinator temporal indication matches the node temporal indication. Knowing that the currently available network is the correct network to join, the node device will store the random number received from the coordinator device. Otherwise it will discard the random number and wait for other messages for joining other networks.

After confirming that the network created by the coordinator device is the network it should join, the node device, at step 44, transmits a joining request, such as an association request, to the coordinator device.

The node device, in transmitting the joining request, also includes its own commissioning start time, and optionally the received flag, in the joining message, such that the coordinator device may also check and confirm that the commissioning start time of the coordinator device and the commissioning start time of the node device match each other.

In the case the commissioning start time is the relative time, the commissioning start time of the node device that is included as the node temporal indication in the joining request is calculated as from time zero until when the joining message is transmitted.

It can be contemplated by those skilled in the art that the node device can transmit the joining request including its commissioning start time right after receiving the network-available message. This still allows the coordinator device to determine that the commissioning start time of the node device is the same or very close to the commissioning start time of the coordinator device in the following step.

At step 45, the coordinator device receives the joining request and checks to determine that the commissioning stat time of the node device is similar to the commissioning start time of the coordinator device. The coordinator device can perform the checking in the same way as the node device.

In the case that the received flag is also included in the transmitted joining request, the coordinator device also checks to see that the received flag is one of the flag that it generated and transmitted to the node device. This further confirms that the commissioning start time recorded by the coordinator device and the commissioning start time recorded by the node device are the same or very similar to each other.

Upon confirming that the commissioning stat time of the node device is similar or the same to the commissioning start time of the coordinator device, at step 46, the coordinator device will allow the node device to join the network, which may be performed according to standard protocol.

As an example, the coordinator device may send an association response to the node device, which contains a short address of the node device. Then the node device will apply a network key and send out a data request. The coordinator device then returns the network key to the node.

If the network key verification is successful, the commission process is complete. After commissioning, the Tx offset could still be used as the original parameter.

The above describes the method of selectively commissioning node devices by the coordinator device, which only allows node devices that are switched on or powered up at the same time with the coordinator device, or very shortly after the coordinator device, to join the network created by the coordinator device. It thereby ensues that only node devices desirable to join the network will be pulled into the network, while preventing other node devices, such as those node devices which are powered up before the coordinator node device is powered up, from being mistakenly joined into the network.

Figure 5:
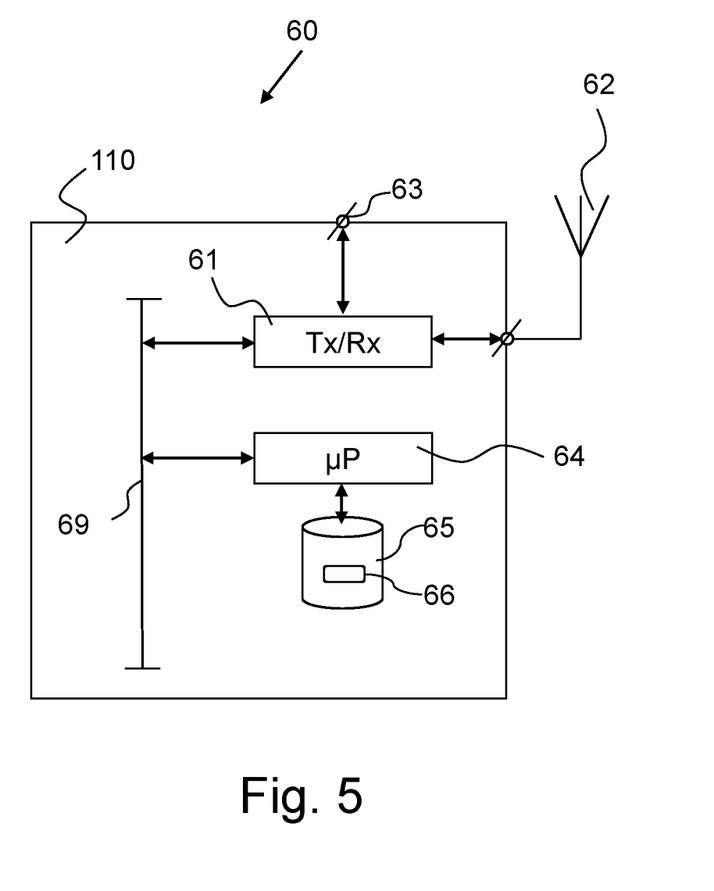
FIG. 5 illustrates, schematically, an embodiment of a coordinator device arranged for selectively commissioning node devices, in accordance with the present disclosure.

FIG. 5 illustrates, in a schematic diagram, a coordinator device 60 arranged for performing the method as described above.

The coordinator device 60 operates a communication interface 61, such as a network adapter or transceiver, Tx/Rx, module arranged for wireless 52 or wired 53 exchange of messages or data packets, such as the network-available message, the joining message as described above, with node device in the network created by the coordinator device 60. Network protocols for exchanging data by networked coordinator device and node devices may comprise ZigBee™ Bluetooth™' as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The coordinator device 60 further comprises at least one microprocessor, μP, or controller 64, and at least one data repository or storage or memory 65, among others for storing for example network identify of the coordinator device 66, as well as information related to the node devices, such as identifiers, IDs, Media Access Control, MAC, addresses, and subscriber information of node devices. The data repository 65 may also store the commissioning start time recorded by the coordinator device 60. Instead of the data repository 65, a separate memory or storage accessible to the at least one processor or controller 64 may be provided.

The at least one microprocessor or controller 64 communicatively interacts with and controls the communication interface 61 and the at least one data repository or storage 65 via an internal data communication and control bus 69 of the coordinator device 60. The at least one microprocessor or controller 64 may operate one or a plurality of selective commissioning algorithms or applications, such as for controlling the node devices, and the protocol stack of the node device 100 comprising the MAC sub-layer functionality to perform the method of selectively commissioning node devices described above.

Figure 6:
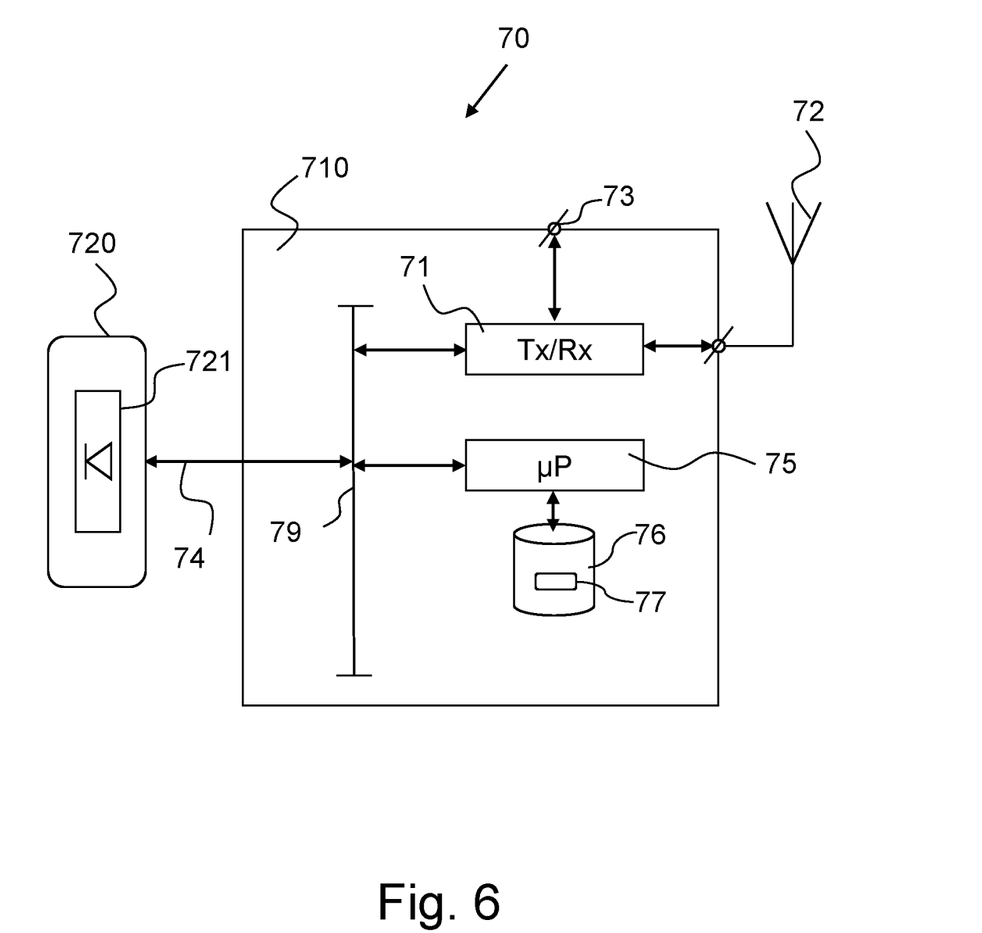
FIG. 6 illustrates, schematically, an embodiment of a node device arranged for being selectively commissioned in accordance with the present disclosure.

FIG. 6 illustrates, in a schematic diagram, a node device 70 arranged for being commissioned by the coordinator device 60 of FIG. 5 in accordance with the method as described above.

The node device 70 comprises a control part or control device 710 and a load such as a lighting fixture or lighting device 720, comprising a lighting module 721, preferably a Light Emitting Diode, LED, lighting module or a plurality of LED lighting modules, operation of which may be controlled by the control device 710 from or through a remote control device, such as a remote or backend server (not shown), for example.

The control device 710 operates a communication interface 71, such as a network adapter or transceiver, Tx/Rx, module arranged for short-range wireless 72 or wired 73 exchange of messages or data packets with another node device in the network, i.e. so called inter-node device communication, and with the coordinator device. Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The control device 710 further comprises at least one microprocessor, μP, or controller 75, and at least one data repository or storage or memory 76, among others for storing address information 77 of the node device itself and other node devices, such as identifiers, IDs, Media Access Control, MAC, addresses, and subscriber information of node devices. The data repository 76 may also store the coordinator temporal indication related to the commissioning start time recorded by the coordinator device that the that the node device 70 receives from the coordinator device, and its own temporal indication related to the commissioning start time that it records. Instead of the data repository 76, a separate memory or storage accessible to the at least one processor or controller 75 may be provided.

The at least one microprocessor or controller 75 communicatively interacts with and controls the communication interface 71, and the at least one data repository or storage 76 via an internal data communication and control bus 79 of the control device 710. The at least one microprocessor or controller 75 may operate one or a plurality of algorithms or applications, and the protocol stack of the node device 70 comprising the MAC sub-layer functionality to interact with the coordinator device and perform the method of being selectively commissioned by the coordinator device.

The lighting fixture or lighting device 720 connects to and is controlled from the data communication and control bus 79 by the at least one microprocessor or controller 710 via a connection link 74.

Those skilled in the art will appreciate that any electric load may be connected, via the connection link, 74 to the control bus 79 other than or in addition to a lighting fixture or lighting device 720, such as an access point device or a geographic routing device.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of selectively commissioning a node device by a coordinator device in a network created by said coordinator device, said method comprising the steps of:
   storing, by said coordinator device, a commissioning start time;
   transmitting, by said coordinator device, a network-available message;
   receiving, by said coordinator device, from said node device a joining request comprising a node temporal indication related to said commissioning start time of said node device;
   determining, by said coordinator device, said commissioning start time of said coordinator device matches said node temporal indication, and commissioning, by said coordinator device, said node device by joining said node device into said network.

2. The method according to claim 1, wherein said network-available message comprises a coordinator temporal indication related to said commissioning start time of said coordinator device and said joining request is transmitted by said node device in response to determining that said coordinator temporal indication matches said node temporal indication.

3. The method according to claim 1, wherein said step of transmitting comprises one of broadcasting, by said coordinator device, a beacon message indicating availability of said network as said network-available message, and transmitting, by said coordinator device, in response to receiving a beacon request message from said node device, a beacon response message indicating availability of said network as said network-available message.

4. The method according to claim 1, wherein said step of determining said coordinator indication matches said node indication comprises the steps of:
calculating, by said coordinator device, a time difference between said commissioning start time of said coordinator device and said commissioning start time of said node device, and
deciding, by said coordinator device, that said time difference is smaller than a predefined threshold value.

5. The method according to claim 4, wherein said coordinator temporal indication related to said commissioning start time of said coordinator device comprises a first elapsed time from said coordinator device being powered up to said network-available message being transmitted by said coordinator device, said node temporal indication related to said commissioning start time of said node device comprises a second elapsed time from said node device being powered up to said joining request being transmitted by said node device, said step of calculating comprises calculating a time difference between said first elapsed time and said second elapsed time.

6. The method according to claim 4, wherein said coordinator device and said node device are synchronized and powered up at substantially the same time, said coordinator temporal indication related to said commissioning start time of said coordinator device comprises a first time when said coordinator device is powered up, said node temporal indication related to said commissioning start time of said node device comprises a second time when said node device is powered up, said step of calculating comprises calculating a time difference between said first time and said second time.

7. The method according to claim 1, wherein said transmitted network-available message further comprises one of a plurality of flags generated by said coordinator device within a time window subsequent to creation of said network, said joining request further comprises said flag.

8. The method according to claim 7, said step of determining that said coordinator indication matches said node indication further comprises determining that said flag comprised in said joining request matches one of said plurality of flags.

9. The method according to claim 1, wherein said transmitted network-available message is transmitted to node devices within a limited number of hops away from said coordinator device.

10. The method according to claim 1, each of said coordinator device and said node device operating in accordance with a Medium Access Control, MAC, data processing protocol sub-layer, wherein said coordinator temporal indication and said node temporal indication are respectively comprised in MAC transmission offset field of said network-available message and said joining request.

11. The method according to claim 10, wherein said step of determining is performed by said MAC data processing protocol sub-layer.

12. A coordinator device arranged for selectively commissioning a node device in a network created by said coordinator device, the coordinator device configured to:
store a commissioning start time;
transmit a network-available message;
receive, from said node device, a joining request comprising a node temporal indication related to said commissioning start time of said node device;
determine said commissioning start time of said coordinator device matches said node temporal indication, and
commission said node device by joining said node device into said network.

13. A node device arranged for being selectively commissioned according to claim 1.

14. The node device according to claim 13, comprising a lighting fixture.

15. A computer program product, comprising a non-transitory computer readable storage medium storing instructions which, when executed on at least one processor, cause said at least one processor to carry out the method according to claim 1.

* * * * *